US007028313B2

(12) United States Patent
Gooding

(10) Patent No.: US 7,028,313 B2
(45) Date of Patent: *Apr. 11, 2006

(54) METHOD FOR TRANSMITTING FUNCTION PARAMETERS TO A REMOTE NODE FOR EXECUTION OF THE FUNCTION THEREON

(75) Inventor: Thomas Michael Gooding, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 720 days.

This patent is subject to a terminal disclaimer.

(21) Appl. No.: 09/819,188

(22) Filed: Mar. 28, 2001

(65) Prior Publication Data

US 2002/0144019 A1    Oct. 3, 2002

(51) Int. Cl.
*G06F 9/46* (2006.01)

(52) U.S. Cl. .................... 719/330; 709/219
(58) Field of Classification Search ............ 709/310, 709/330, 312, 316, 217, 219, 203, 205; 717/138; 719/315, 330–332, 310; 707/10
See application file for complete search history.

(56) References Cited

U.S. PATENT DOCUMENTS

| | | | |
|---|---|---|---|
| 4,274,139 A * | 6/1981 | Hodgkinson et al. ....... | 709/203 |
| 5,218,699 A | 6/1993 | Brandle et al. ............ | 395/650 |
| 5,265,250 A | 11/1993 | Andrade et al. | |
| 5,442,791 A | 8/1995 | Wrabetz et al. | |
| 5,491,800 A * | 2/1996 | Goldsmith et al. ......... | 709/221 |
| 5,617,570 A * | 4/1997 | Russell et al. ............ | 709/312 |
| 5,659,701 A | 8/1997 | Amit et al. ............... | 395/684 |
| 5,682,534 A | 10/1997 | Kapoor et al. ............ | 395/684 |
| 5,687,373 A | 11/1997 | Holmes et al. ............ | 395/682 |
| 5,898,835 A * | 4/1999 | Truong ..................... | 709/217 |
| 5,918,011 A * | 6/1999 | Watanabe et al. .......... | 709/205 |
| 5,918,015 A * | 6/1999 | Suzuki et al. ............. | 709/219 |
| 5,953,514 A * | 9/1999 | Gochee .................... | 717/138 |
| 6,006,230 A * | 12/1999 | Ludwig et al. ............. | 707/10 |
| 6,044,409 A * | 3/2000 | Lim et al. ................. | 719/315 |
| 6,105,073 A | 8/2000 | Choung ................... | 709/321 |
| 6,108,715 A * | 8/2000 | Leach et al. .............. | 719/330 |
| 6,223,217 B1 | 4/2001 | Pettus | |
| 6,249,822 B1 * | 6/2001 | Kays et al. ............... | 719/330 |
| 6,418,484 B1 * | 7/2002 | Radia ...................... | 709/316 |
| 6,708,223 B1 * | 3/2004 | Wang et al. .............. | 719/315 |
| 6,842,786 B1 * | 1/2005 | Webb ...................... | 709/230 |

\* cited by examiner

*Primary Examiner*—Thomas Lee
*Assistant Examiner*—Van H. Nguyen
(74) *Attorney, Agent, or Firm*—Patterson & Sheridan LLP

(57) ABSTRACT

A method for transmitting local node function parameters to a remote node for execution of the function on the remote node, wherein the method may be embodied on a computer readable medium. The method includes the steps of placing each of the function parameters on a first stack and associating a representation string with the function parameters, wherein each character in the representation string corresponds to the data type of an individual function parameter on the first stack. The method further includes dereferencing pointer parameters on the first stack, generating a pure value buffer with the function parameters and the dereferenced pointers, and transmitting the pure value buffer to the remote node.

14 Claims, 11 Drawing Sheets

METHOD FOR TRANSMITTING FUNCTION PARAMETERS TO A REMOTE NODE FOR EXECUTION OF THE FUNCTION THEREON

BACKGROUND OF THE INVENTION

1. Field of the Invention

The present invention relates execution of a function and/or procedure call on a remote node of a network environment. Further, the present invention relates to the transmission of function related parameters from a local node to a remote node so that the function may be executed on the remote node.

2. Background of the Related Art

The design of a user-level programming interface for a complex system generally requires the programmer to attempt to abstract out underlying and/or supporting details of the system so that the user does not regularly encounter complex program specific information. In distributed-type computing environments in particular, this process is generally undertaken with the assumption that there is a client node upon which user functionality runs, along with a server node where supporting program code for the functionality is generally executed. In this type of configuration, the client code generally operates to merely translate input data received and/or manipulated at the client end into a form that the program code on the server node is capable of receiving and processing. Thereafter, upon instruction of the user, the user node input information may be transmitted by the user node to the server node, or another remote node capable of executing the desired functionality, where the input is received and processed in the language of the program code. The processing of the program code generally includes unpackaging the input data sent to the server node and executing the appropriate functionality on the server node. Once the input data is processed, the resulting data may be returned to the user node for presentation to the user.

Although this process is generally effective in accomplishing the execution of a particular functionality, the process time consumption is inherently high. In particular, the process suffers from efficiency delays as a result of the time required for the input data to be translated into a language that is compatible with the program code. Further, the input data must be packaged and transmitted across the network to the node where the program code resides, which also inserts a delay into the performance of conventional systems. These delays and/or timing penalties may typically be anywhere from several hundred microseconds to several seconds in duration. This range is generally dependent upon the network topology, the performance characteristics of each individual node, the amount of data involved the transaction, and/or other network configuration related parameters. For example, network latency resulting from transmission of data across the network can be rather large in a distributed environment, as the cost of performing a single operation on the server node, which may be for example, 15 microseconds, may easily be overshadowed by the cost of sending the command across the network and waiting for the remote node to reply, which may be on the order of 500–1000 microseconds in a best case scenario.

Therefore, in a situation requiring optimal performance without substantial delay penalties, conventional users generally attempt to run their application and/or functionality directly on the node having the program code thereon, i.e., the server node of the system. However, since the client application program interface (API) is generally different than the server API in conventional configurations, the user is generally required to re-write their application to the server API in order to execute on the server node. In addition, the user may wish to continue the ability to run on the client node. This process involves substantial additional programming steps at the local node level in order to render the respective API's compatible. Additionally, the additional programming steps implemented locally to allow the respective nodes to communicate may need to be modified if the functionality changes, as the additional code may not be completely compatible with the new functionality. Alternatively, conventional methods attempt to keep the API's constant between the respective nodes, while creating explicit helper functions for each service to translate between the network data and the function data. Although generally effective in executing the functionality, this method generates high code maintenance overhead and can be extremely difficult to debug. Additionally, both of the aforementioned conventional methods suffer from the timing penalties associated with the packaging and transmission of the input data across the network to the remote node having the source code thereon.

In view of the deficiencies in conventional methods, there exists a need for a method that allows a function call and the associated parameters to be available on all nodes of a network system. The method would preferably decide whether a functional operation can be executed on the local node, and if not, then forward the function request to an appropriate node for processing. However, if the functionality is to be executed on a remote node, it is desired that the input parameters for the function be transmitted to the remote node via a packaging configuration calculated to generate minimal delay.

SUMMARY OF THE INVENTION

Embodiments of the present invention provide a method for transmitting local node function parameters to a remote node for execution of the function on the remote node, wherein the method may be embodied on a computer readable medium. The method includes the steps of placing each of the function parameters on a first stack and associating a representation string with the function parameters, wherein each character in the representation string corresponds to the data type of an individual function parameter on the first stack. The method further includes dereferencing pointer parameters on the first stack, generating a pure value buffer with the function parameters and the dereferenced pointers, and transmitting the pure value buffer to the remote node.

Embodiments of the present invention further provide a method for transmitting function related data from a first node to a second node, wherein the method includes generating a stack having the function related data stored thereon and dereferencing pointer parameters in the function related data with a representation string. The method further includes generating a pure value buffer, and transmitting the pure value buffer to the second node.

Embodiments of the present invention further provide a computer readable medium having a program thereon, that when executed by a computer processor, performs a method for transmitting local node function parameters to a remote node for execution of the function on the remote node. The method includes the steps of placing each of the function parameters on a first stack and associating a representation string with the function parameters, wherein each character in the representation string corresponds to the data type of an individual function parameter on the first stack. The method further includes dereferencing pointer parameters on the first stack, generating a pure value buffer with the function parameters and the dereferenced pointers, and transmitting the pure value buffer to the remote node.

Embodiments of the present invention further provide a computer readable medium having a program thereon, that when executed by a computer processor, performs a method for transmitting function related data from a first node to a second node, wherein the method includes generating a stack having the function related data stored thereon and dereferencing pointer parameters in the function related data with a representation string. The method further includes generating a pure value buffer, and transmitting the pure value buffer to the second node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally overcomes the deficiencies of conventional methods by allowing a function call and the respective parameters associated with the function call to be available to more than just non-server nodes. Therefore, for example, a function (x) and its associated data resident on node 1 of a network may be read and or generally accessed by another node on the network. In this configuration, when function (x) is called, then the function itself may be configured to determine whether the functional operation would be most efficiently executed locally or on another remote node. If function (x) is best suited to be executed on another node, then function (x) may call a routing function. The routing function may be configured to package the parameters associated with function (x) from the stack and transmit the packaged parameters to the node best suited to execute the function. Once the parameters are received on the remote node, function (x) may be invoked on the remote node and processed thereon using a replicate stack. When the function exits and/or completes, then the remote node packages the return data and transmits this data back to the originating node. The originating node, which is note 1 in the present exemplary embodiment, may then copy the return data into the appropriate places. Alternatively, if the local node, i.e. node 1, is capable of executing the function, then the function may simply be executed on the local node without involving any routing and/or transmitting of data to a remote node.

However, each of the above noted actions and/or method steps generally take place transparently to the user. In particular, the user is generally unaware that the processes associated with executing the functionality of function (x) were transferred to another node for execution. As such, that when the routing function call exits, i.e., when the function data is returned to the local node by the executing remote node, all of the functional related data is present on the local node and the user is entirely unaware of any network operation. Therefore, the present exemplary embodiment provides the ability to execute a function on a remote node without requiring substantial helper-type codes to be implemented in order to allow the local node API to communicate with a server and/or remote node API.

Figure 11:
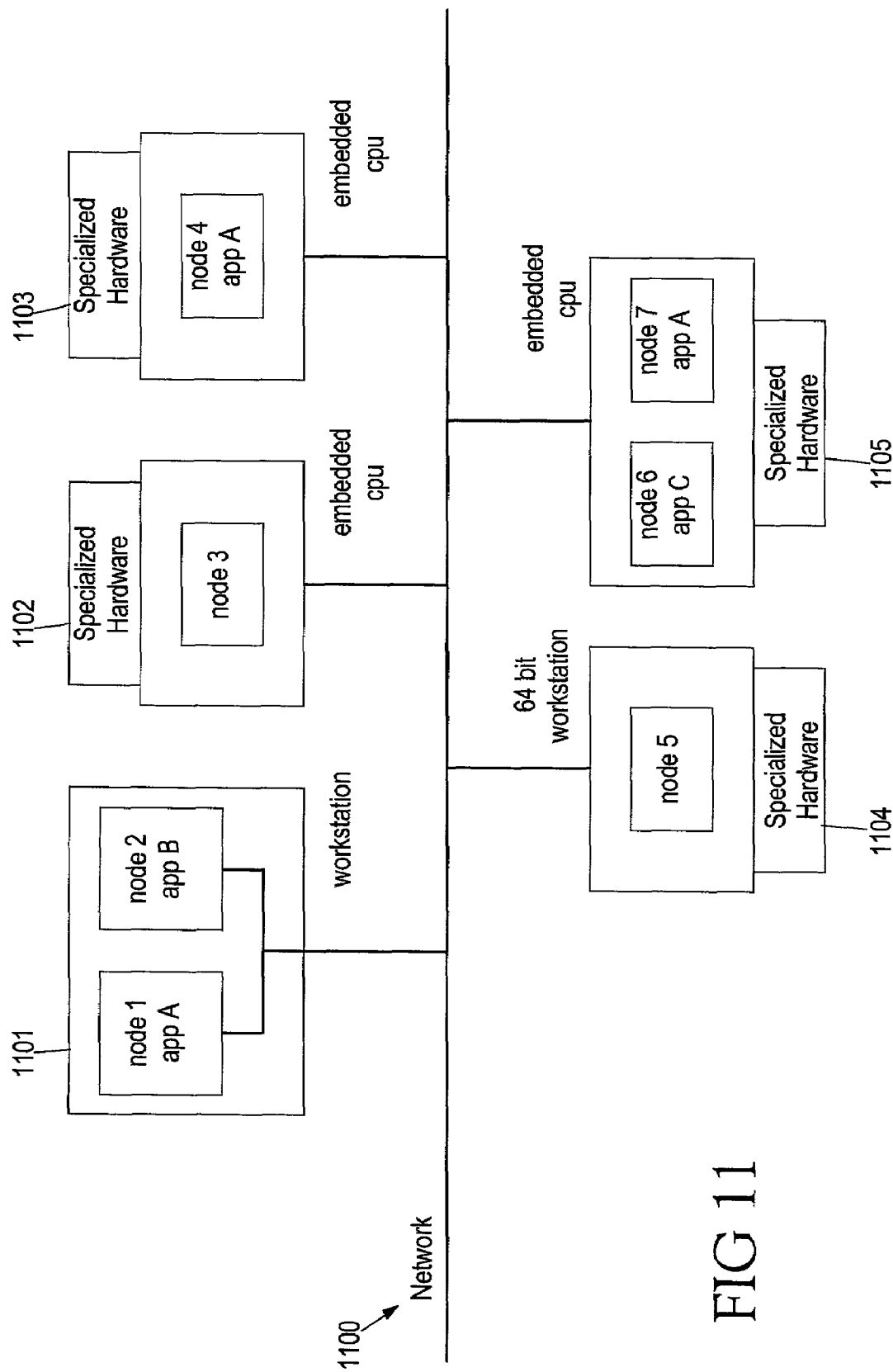
FIG. 11 illustrates an exemplary hardware configuration of embodiments of the present invention.

FIG. 11 illustrates an exemplary configuration of a network wherein the method of the present invention may be implemented. The network 1100 of FIG. 11 illustrates five exemplary network locations 1101, 1102, 1103, 1104, and 1105. Each of the respective locations includes at least one node. For example, Node 1 in location 1101 may include program information and/or data related to Application A, while Node 2 in location 1101 may include program information and/or data related to a separate Application B. Location 1102 may include Node 3 and be in communication with various specialized hardware. Location 1103 may include Node 4 having Application A thereon and also be in communication with various specialized hardware. Both of locations 1102 and 1103 may be embedded CPU-type locations, for example. Location 1104 may be a 64-bit, for example, having Node 5 thereon and being in communication with selected specialized hardware. Location 1105 may include Node 6 having Application C and Node 7 having Application A thereon and be in communication with specific specialized hardware. Location 1105 may also be an embedded CPU-type location. Each of the respective locations may be in communication with each other via the shared network.

Therefore, referring to the exemplary configuration of FIG. 11, when a function is called on Node 3, it may be determined that the specific function is best executed via Application A. Therefore, it may be determined that the function should be transferred to either Nodes 1, 4, or 7. Assuming that Node 1 is selected, then the function and its related data may be transparently transmitted to Node 1 for execution. Upon executing the function, Node 7 may transmit the resulting function data back to Node 3. Node 3 may receive the resulting function data and process the data as if it were executed locally, all of which is generally transparent to the user on the local originating node. Thus an application/function can essentially run on any node in the system and can be moved around without affecting the processing results of the application/function. For example, application A can be run on node 1 and have most of the commands travel across the network. But since the API is generally consistent on all nodes and each function knows where to route the commands to get the operations executed. Thus, Application A could simply be loaded and execute on node 2 without a recompile or any changes and therefore execute much faster. Further, it should also be noted that if node 2 is running a different OS microprocessor type or other data type, a recompile may be necessary, however, the recompile would not affect the operation of the API.

In another exemplary embodiment of the present invention, the latency affects of data transfers between a local and a remote node may be further reduced. In particular, latency may be reduced by recording commands that do not have parameters that were modified or derived from the results of prior commands in the recording. The recording of commands that are not overly time/order sensitive thereafter allows the user to bundle and send recorded commands in a single transaction. This bundling of non-time/order sensitive commands allows for efficient use of command transaction overhead time, as multiple commands may be executed under a single command transfer overhead structure.

In another exemplary embodiment of the present invention timing delays are further reduced with a data caching technique. The caching technique generally includes caching data that may be subsequently requested and return the same result as a previous request. For example, when commands are encountered that return data that does not change the state of the remote system and that always corresponds to the same data with the same input keys, then the resulting data may be cached on the local node. This cached data may then be used to fulfill a subsequent request for the same information. The process of caching the resulting data allows the present invention to present a cached response to a user request when the request corresponds to a previously executed request for information that has not changed in the interim time period. The caching technique generally requires that the previously cached response data is still available in cache memory, as cache memory is often cleared after data has been resident and unused for a period of time, and can be used instead of re-querying the remote node. In similar fashion to the transparency of the function call to the remote node, the user is also generally unaware of the caching operations, as these operations are generally transparent to the end user.

In another exemplary embodiment of the present invention, timing delays are further minimized via selective transmission of data between the local and remote nodes during function execution processes. For example, for buffer parameters, which may include some arrays, that do not contain input data necessary for execution of the function on the remote node, the contents of the buffer relative to these buffer parameters do not have to be passed across the network. Rather, this information may be pointed to by the local node and accessed by the remote node if necessary. More particularly, this embodiment may operate to avoid transmitting information to the remote node that known to be explicitly write-only or read-only. Therefore, the existing data is not going to be used and/or modified respectively. Using this exemplary embodiment, the amount of data transmitted to the remote node for processing of the function on the remote node is minimized, which in turn, minimizes the transmission time of the data across the network and increases the efficiency of the method.

Figure 1:
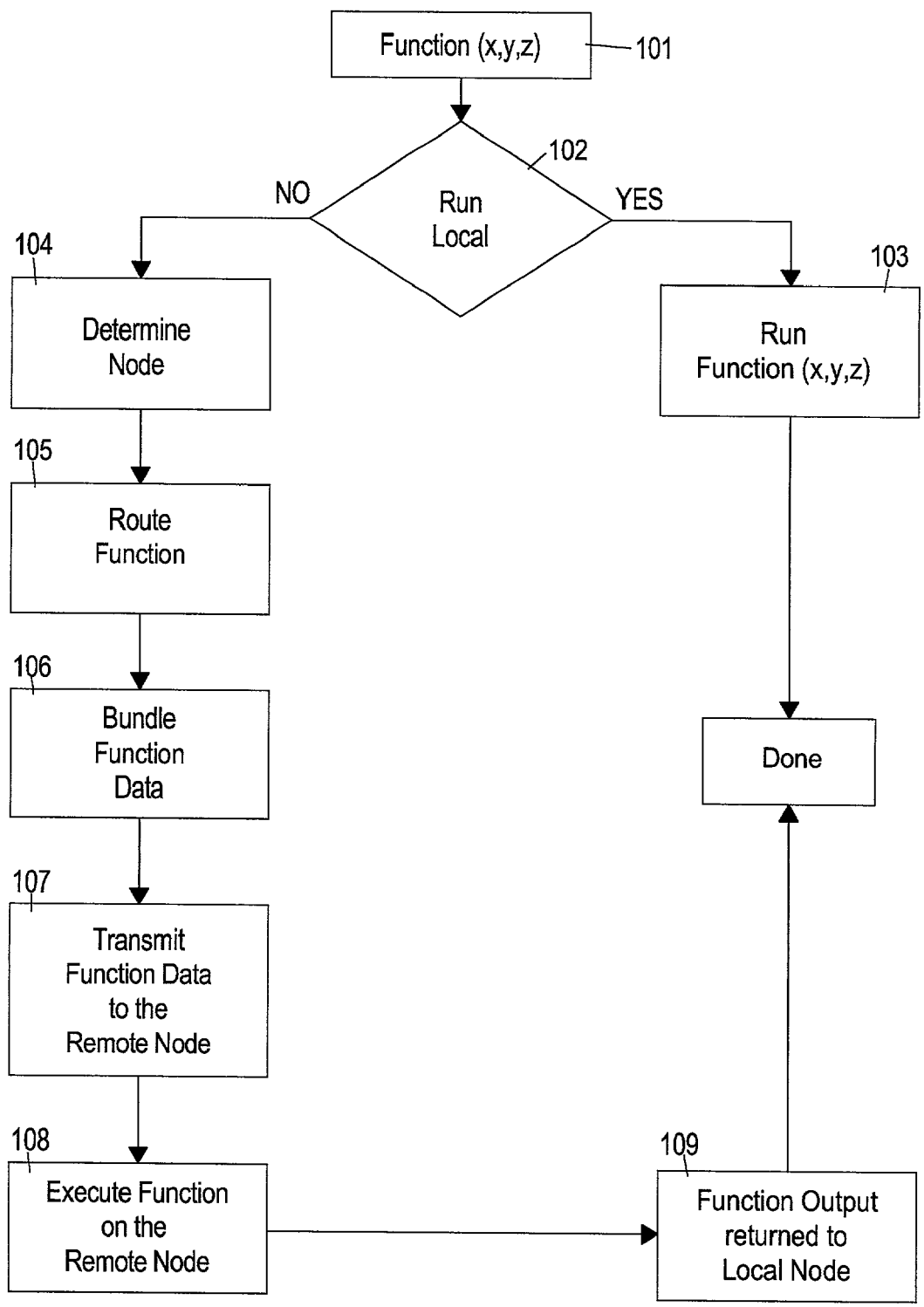
FIG. 1 illustrates an exemplary flowchart of the present invention.

FIG. 1 illustrates an exemplary general logic flow of the present invention. The logic begins at step 101 with an API function call, which will be referred to as function (xyz), on the local/user node. Thereafter, the function determines if it can be run on the local node at step 102. If the function is determined to be a function that can be run on the local node, then the local node executes the functionality on the local node and returns the results to the user at step 103. Thereafter, the logic flow is complete for the present local function call. If the function is determined to be a function that should be run on another node, either a server node or other type of node, for example, then the method continues to step 104, where the proper node for execution is determined. The determination of whether or not a function may be executed on a local node may generally be determined through reference to a location descriptor associated with the particular function, as the location descriptor may generally indicate where the proper node is for execution of the respective function. Examples of information contained in the location descriptor data may be a socket address, a function service identifier, and/or other node identification parameter. The function service identifier may also be obtained via a stack trace-back symbol lookup.

Once the proper node is determined at step 104, then a ROUTE function may be called at step 105. With the proper node determined and the route function determined, the method continues to step 106, where the data necessary to execute the function may be bundled for transmission to the appropriate remote node. This type of information may be, for example, integers, pointers, arrays, addresses, and/or other data related parameters. However, as noted above, the present invention does not blanket send functional data to the remote node. Rather, the present invention determines if the data and/or parameters being sent to the remote node qualify as data that must be sent to the remote node. For example, if a data file does not contain input data specifically necessary for the execution of the function on the remote node, then the data file is not sent across the network to the remote node in support of the execution of the function. Additionally, the bundling process of step 106 may include a flattening process, wherein the supporting functional data is essentially compacted and/or compressed for transmission across the network through implementation of a descriptive data structure. The descriptive data structure, which may be termed a DTSTRUCT or representation string, may include a structure describing the data types being bundled for transmission across the network. Once the data is bundled, then the data is transmitted to the remote node at step 107.

When the data and functional information is received by the remote node, the function is executed on the remote node at step 108. Once the function is executed, the output data for the function may be returned to the local node at step 109. The transmission of the function output back to the originating local node may also include some filtering and/or compressing-type steps in order to minimize the quantity of data transmitted back to the local node. For example, if the function that is executed on the remote node requires 2 megabytes of input data in order to generate 64 bytes of output data, and the input data is unchanged by the function, then the input data may not be transmitted back to the originating local node. Since the input data is unchanged, the transmission of this data back to the local node is essentially an unnecessary use of network bandwidth that results in timing delays for the execution of the function.

Additionally, the process of executing a function on the remote node is completely transparent to the user on the local node. The user is not required to determine on what node the function is to be executed, send the function and/or the supporting data to the remote node, or to in any way interact with the process during the routing, flattening, transmission, or execution stages of the function. Therefore, the processes associated with executing the function on a remote node are essentially transparent to the user.

Returning to the discussion of the ROUTE function illustrated in steps 104–107 in FIG. 1, the ROUTE function of the present exemplary embodiment may include several arguments. As briefly noted above, the ROUTE function may include a location descriptor of the node/service that will run the current function command. This location descriptor may be in the form of a structure containing a socket address and a function service identifier, or in another form calculated to illustrate the appropriate node for execution of the respective function. Additionally, the ROUTE function may include a data structure describing the data types listed in an associated variable argument list. This variable argument list, which has been referred to above as DTSTRUCT, may be as simple as a static textual string representing corresponding to the data types of the data required to accomplish the execution of the function. Additionally, the present invention contemplates that the node transmitting a command may transmit the command to a node on the same machine or a node on another completely separate machine. Further, although the present invention describes the configuration with respect to the function being executed on the remote node, the process may be such that the function is properly executed on the local node. In this situation a remote node may transmit the function-related data to the local node for execution thereon.

In view of the substantial number of possible data types that may be incorporated into, used by, and/or modified by a function call, the variable argument list or DTSTRUCT may be configured to reference various different data types. For example, the DTSTRUCT may represent pass by value operands for 8-bit, 16-bit, and/or 32-bit quantities and/or pointers, which may allow for automatic handling of little to big endian-type conversions. DTSTRUCT may also represent arrays of 8-bit, 16-bit, and/or 32-bit quantities. In this configuration, the array length may be preceded by a "count" parameter that may or may not have been present in the function's parameter stack or list. DTSTRUCT may also represent classes, strings, and/or structures as an array of 8-bit data. Further, DTSTRUCT may be configured to represent double pointers or handles, doubly-scripted arrays, arrays of pointers-to-arrays, 32-bit count parameters, and/or pointer to 32-bit count parameters. DTSTRUCT may also be configured to represent Singly-type linked lists, wherein the size of the linked list generally precedes the linked list pointer in the variable argument list. This generally assumes that the next pointer is at a pre-defined location within the data structure, generally either at the beginning or the end of the data. This configuration is preferred for handling a potential 32 bit to 64 bit address pointer conversion. DTSTRUCT may also be configured to represent doubly-linked lists, wherein the size of the linked list may again precede the linked list pointer in the variable argument list. This generally assumes that the next and previous pointers are at a pre-defined location within the data structure. This is preferred for handling of a potential 32 bit to 64 bit address pointer conversion. Additionally, DTSTRUCT may also be configured to represent various user definable structures, such as user specified flatten and unflatten routines. It should be noted, however, that DTSTRUCT is not limited to representing the above noted data types. Rather, DTSTRUCT may be configured to represent essentially any data type.

In addition to referencing the above noted data types, DTSTRUCT may be configured to contain various "hint" types. For example, DTSTRUCT may be configured to contain an indicator that is represents that the next variable argument parameter may be used as a key in caching a network operation. DTSTRUCT may also include an indicator specifying a maximum timeout value to wait for a reply or an indicator that the next variable argument parameter can be left uninitialized. DTSTRUCT may also include an indicator specifying the size of a record or an array. Again, however, DTSTRUCT is not limited to the specific examples provided, as various other hint-type parameters may be represented and/or incorporated into the DTSTRUCT parameter.

Based on the above noted data types expressed in DTSTRUCT, the ROUTE function, as briefly discussed above, essentially operates to flatten each of the variable arguments specified in the call to the ROUTE function into a buffer. The flattening process, which will be further discussed herein, generally includes compressing and/or selecting portions of data that are to be transferred across the network to the remote node so that transmission latency delays may be minimized. The DTSTRUCT and function service identifier may also be included in the buffer contents, so that the opposing node will be able to decode and/or unpackage the data and call the appropriate function on the opposing node. If cache keys specified in DTSTRUCT, then the data value of these keys may then be checked to see if the remote reply is resident in cache memory. If the data is in cache memory, then the ROUTE function may forgo the routing operation by unflattening the cached response and immediately exit. If the data is not resident cache, or alternatively, if there are no keyed parameters, then the buffer may be transmitted across the network to the remote node by the ROUTE function. The remote node receives the command and buffer contents and decodes the buffer using the DTSTRUCT passed thereto in the buffer contents. While the remote node unflattens the buffer contents, it also generates a call stack that generally mirrors, in structure, the original call stack on the local originating node.

Although pointer values may have changed between 32 bit and 64 bit in the flattening and unflattening processes, the data that the pointer points to is essentially identical on the remote node as the data would be on the local originating node. Therefore, the remote node may look up the function pointer using the function service identifier and call the pointer using the replicated call stack. The function then executes, and the execution is now on the correct node, it executes the actual code of the service, generally exactly as if it were called locally. After the function executes and exits, the remote node may use DTSTRUCT to flatten the return data for the local originating node. Since only pointers are generally returned as data to the calling function, only datatypes listed as pointers in DTSTRUCT need to be passed back to the local originating node. Furthermore, some data may be marked as read-only in DTSTRUCT, so that the corresponding pointers may also be excluded from the return data transmission. The flattened return data may be sent across the network to the local originating node. Also, since the data is transferred and not the actual pointer value, the flatten process is immune to problems of a 32 bit application communicating with a 64 bit application, and vice versa.

During the time period in which the ROUTE function executes and the remote node carries out the functionality of the desired function, the local originating node will generally be blocked while waiting for the reply. Once the return data is received, the local node may determine if there are cache keys specified in the remote node copy of DTSTRUCT. If so, then ROUTE may copy the flatten query and response into a cache memory for possible subsequent accesses without calling the remote node. Using the local DTSTRUCT copy, the ROUTE function may unpackage the return data received from the remote node and copy the flattened data back into the original pointers passed by the function. Once this is complete, the ROUTEO function may return the value of the return code that the remote node's function execution generated. Thereafter, the local node's function will likely return only the cached information rather than calling the function on the remote node to recalculate the function using the same parameters.

In order to generate a list of operations, the code in the function generally needs to be aware that ROUTE is recording operations. If ROUTE is recording, then the command will generally be sent to ROUTE in order to capture commands that would be run locally as well as the remote commands. When recording the operation, there are, for example, two possible spots to record the command. The command may be captured when the DTSTRUCT is parsed, which would operate to capture any pointers to data, but not the data itself. Alternatively, for example, it could be recorded after the operation has been flattened. The former method has the advantage of allowing the user to setup static buffers and read/write the new data in them for each execute operation of the list. The later method generally assures that the input data is always the same for the list. The present invention may implement both methods, and therefore, allow the user to choose the desired method for the particular application. When ROUTE is done recording the command, it may choose to return immediately or actually execute the command. If the execute-after-record mode is set, the ROUTE command will generally temporarily disable command recording in order to avoid entering into an infinite loop.

With regard to the execution of the list, there are generally two main modes of operation. The first mode of operation is a Strict Serial Execution-type operation. With this type of execution, when walking serially through the list, contiguous operations that go to the same node may be flattened and/or copied into the same buffer. When an end-of-list or change-of-node event is encountered, then the buffer may be transmitted to that node and a response generally received before any subsequent commands in the list going to other nodes are processed. On the remote node, the operations may be executed in a first-in first-out type order. Another mode of operation is a Scatter/Gather Execution with operation synchronization points, wherein when walking serially through the list, operations are flattened and/or copied into a dedicated buffer for that node. When an end-of-list or synchronization point is encountered, then all the buffers are transmitted to their respective nodes and all responses are generally received before any subsequent commands in the list are processed. The user may add a synchronization point when constructing the list in order to specify points at which all commands need to be completed before subsequent commands can be properly executed. On the remote node, the operations may again be executed in a first-in first-out type order.

For either mode of execution, if an error occurs in any list operation, then the entire list execution is generally aborted. Detection of this type of fault may be, for example, when a function calls a callback function that notifies the list-execution function of the error and to stop the list execution. Also, the function may set a global variable that notifies the list execution function of the error and to stop the list execution. Further, when the function's return code is non-zero, or not equal to a value preset by the user, or when the function's flattened return parameters are set to a predetermined value, then the list execution may be stopped.

Figure 2:
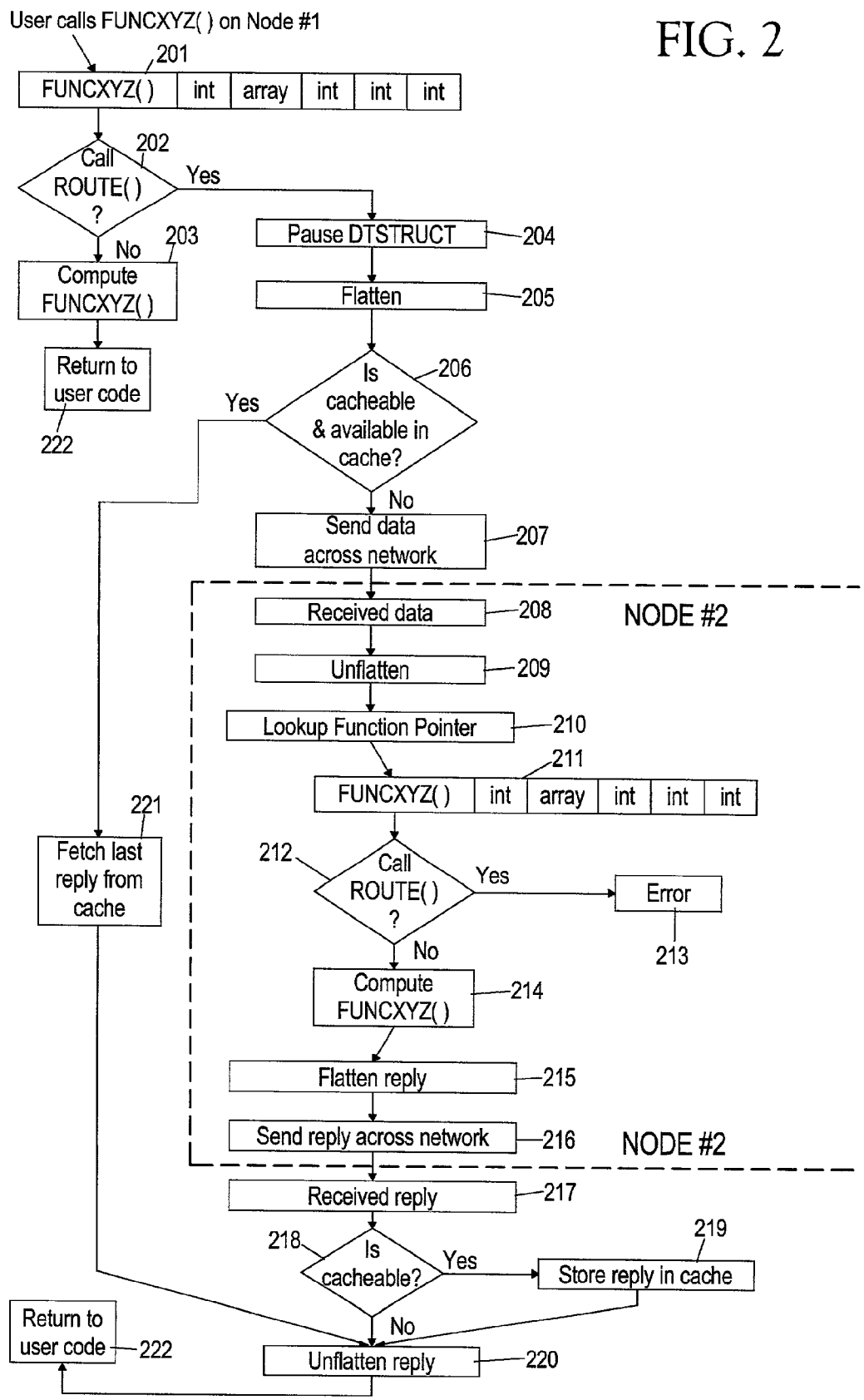
FIG. 2 illustrates an exemplary method of the present invention.

FIG. 2 illustrates a flowchart of an exemplary embodiment of the present invention. The flowchart begins at step 201 where a call is made for the execution of a particular function, which is illustrated as FUNCXYZ( ), on a local node of a network. The local node in the present exemplary embodiment generally represents the node where the user resides that desires the function to be executed. The function FUNCXYZ( ) may include a number of parameters and/or associated data that are generally passed to the function and used in the execution thereof. For example, the "int," "array," "int," "int," and "int" parameters listed next to FUNCXYZ( ) may represent the parameters and/or data that FUNCXYZ( ) accesses, read, and/or writes during execution of the function. These string referencing these parameters may be termed a DTSTRUCT. The listed parameters or DTSTRUCT may represent, for example, an integer, an array, and three additional integers. However, various other types of data and parameters, such as pointers, addresses, linked lists, and other function-type data that may be used by a function during execution may be represented in the list of parameters. When FUNCXYZ( ) is called, the function itself, or a sub-function thereof, may determine if the function called may be executed on the local node, or alternatively, if the function must be routed to another node for execution. This determination is shown as step 202, as if the function can be executed locally, then a ROUTE function need not be called. Alternatively, if the function cannot be executed on the local node, then a ROUTE function may be called to facilitate execution of the function on the appropriate node. Thus, if the function can be executed on the local node, and therefore ROUTE it not to be called, then the method continues to step 203 where the function is executed before returning to the original user code requesting the function call at step 222.

If the function determines that it cannot be executed on the local node, and therefore, ROUTE must be called, then the method continues to step 204. At step 204 the DTSTRUCT parameters noted above may be parsed in preparation for a flattening process at step 205. The flattening process of step 205 generally includes assembling the function-related data represented by each of the parsed DTSTRUCT parameters into a common memory location. This allows for a more efficient transfer of the function-related information across the network to the remote node, as a single data transfer operation may be conducted on the assembled data. This process improves the efficiency of the present invention over conventional methods, as a single transfer upon assembling the data is substantially more efficient than transmitting each of the respective data elements individually upon retrieving the respective element from the appropriate memory location.

Once the data is assembled by the flattening routine, then the method continues to step 206 where it is determined if the flattened data, or a portion thereof, is cacheable. If the data is determined to be cacheable, then the method further determines if the data is in fact already resident in cache memory. If both conditions are satisfied, then the method continues to step 221 without ever executing the function on the remote node. The determination of whether data or portions of data are cacheable may be undertaken via reference to the DTSTRUCT, as FUNCXYZ( ) may insert a parameter indicating that certain portions of data represented by the DTSTRUCT are cacheable. If the data is cacheable and found in the cache memory, then the method retrieves the most recent reply from cache memory corresponding to the current function call at step 221, and then continues to step 220. At step 220 the most recent function call retrieved from cache memory is unflattened and presented to the user. Thereafter, the method continues to step 222, where the method returns to the user code that originally called the function.

The process of steps 206, 221, and 220 generally operate to determine if the current function call has been previously executed and cacheable. If it is such a function, then the goal of the present method is to avoid time required to re-execute the function by simply using the results of the previous function execution. Therefore, before a function call is transmitted to a remote node for execution, the method first determines if the results of the function call are available in a local cache memory. If the results are available, then the function is not called and the previous results are used. The previous results, which are generally stored in cache memory in a flattened state, may be unflattened prior to being used as the response to the function call.

Returning to step 206, if the data is determined not to be cacheable or not available in cache, then the method continues to step 207, where the bundled data is transmitted across a network to a remote node designated for execution of the particular function. The particular remote node designated to receive this information may be determined from a designated parameter associated with the function to be executed. This designated parameter may act as an indicator to ROUTE as to the appropriate node for execution of the particular function.

Once the function data is transmitted at step 207, the remote node designated for execution of the function receives the transmitted data at step 208. Upon receiving the data the remote node unflattens and/or decodes the data at step 209. The unflattening process generally includes recreation of the functional data structure from the originating local node. Therefore, the remote node has essentially all of the data necessary to execute the function on the remote node itself and does not need to request data from other nodes in order to execute the function. Thus, using the present example, the remote node would generate the "int," "array," "int," "int," and "int" parameters illustrated at step 201 on the remote node for use in executing FUNCXYZ( ) on the remote node. However, in recreating the required data structure, the remote node does not necessarily have to duplicate the data on the remote node itself. Rather, the remote node may utilize data identifiers, such as pointers, that indicate where the data necessary to execute the particular function resides.

Once the data required to execute FUNCXYZ( ) is unflattened on the remote node at step 209, the method continues to step 210. At step 210 the method user a service identifier passed in the buffer to locate the address for FUNCXYZ( ) on the remote node. The lookup function pointer may be generally configured to determine where FUNCXYZ( ) exists on the remote node, as the function address is almost certainly different from the address indicated by the local originating node. Therefore, the lookup function pointer may use a registry method, as is generally known in the art, in order to determine the location of FUNCXYZ( ) on the remote node.

Once the location of FUNCXYZ( ) on the remote node is determined, then the function is executed on the remote at step 211. However, in similar fashion to the attempted execution of FUNCXYZ( ) on the local originating node, FUNCXYZ( ) may attempt to determine if the function may be executed on the current node, which is now the remote node. This process includes determining if ROUTE needs to be called in order to forward the function to another node, as shown in step 212. If it is determined that ROUTE should be called, then the method continues to step 213, which generally represents an error state in the system. Since the local originating node determined that FUNCXYZ( ) would be properly executed on the remote node, then the determination on the remote node to call ROUTE may represent a breakdown of the method. Alternatively, if the determination in step 212 is not to call ROUTE, then the remote continues to step 214 where FUNCXYZ( ) is computed and/or executed on the remote node. Upon execution of the function, the resulting data and/or output of the function may be flattened at step 215, in similar fashion to the flattening process shown at step 205. Once the flattening process of step 215 is complete, the flattened data may be sent across the network to the local originating node at step 216. This may conclude the operation and/or involvement of the remote node in the execution of the present function.

Once the reply data for FUNCXYZ( ) has been flattened and sent the network by the remote node, it may be received at the originating local node at step 217. Upon receiving the flattened reply, the local node may determine if the reply is cacheable at step 218. This step generally corresponds to determining if the particular reply corresponds to a function that may be called numerous times and return the same result each time. As such, functions that have an output that varies with time or other dynamic variables would not generate cacheable-type replies. However, functions that use the same input keys and data for each execution would generally be suitable for caching their replies, as the reply from the function may generally be assumed to be identical when the same input parameters are used. Therefore, if the reply is determined to be a reply that is cacheable, then the method continues to step 219 where the reply is stored in cache memory. In storing the reply in cache, a suitable indexing scheme may be employed, as is known in the art, so that the reply may be easily retrieved by, for example, method steps such as steps 206 and 207 of the present exemplary method. Regardless of whether the reply is cacheable or not, the method continues to step 220 where the reply is unflattened. This step generally corresponds to the unflaftening step at the remote node, and in similar fashion, may be generally described as an inverse function to the packing-type function accomplished by the flattening processes. Once the reply is unflattened, it is generally in a form that is useable by the user code on the local node, as shown in step 222.

Therefore, the end result of the exemplary methodology shown in FIG. 2 is that the resulting data of the function that was requested by the local node is returned to the local node after being computed by the remote node. Further, the actions associated with the execution of the function on a remote node are completely transparent to the user at the local node. The user is not required to interact with the system in any way in the process of determining if the function can be executed locally, bundling and transferring the function to the remote node, processing the function on the remote node, and/or receiving the resulting data from the remote node. Additionally, although the present method implements the transparent execution of a function on a remote node, the execution time associated with the remote execution is substantially less than conventional transparent remote node function calls. Further, the execution time of the present invention is reduced as a result of the reductions in network latency implemented by the exemplary method. Therefore, the exemplary method generally allows for a function to be transparently executed on a remote node and the resulting data presented to the user on the local node, wherein the transparent remote execution utilizes substantially less overhead, in both time and user interaction, when compared to conventional methods.

Figure 3:
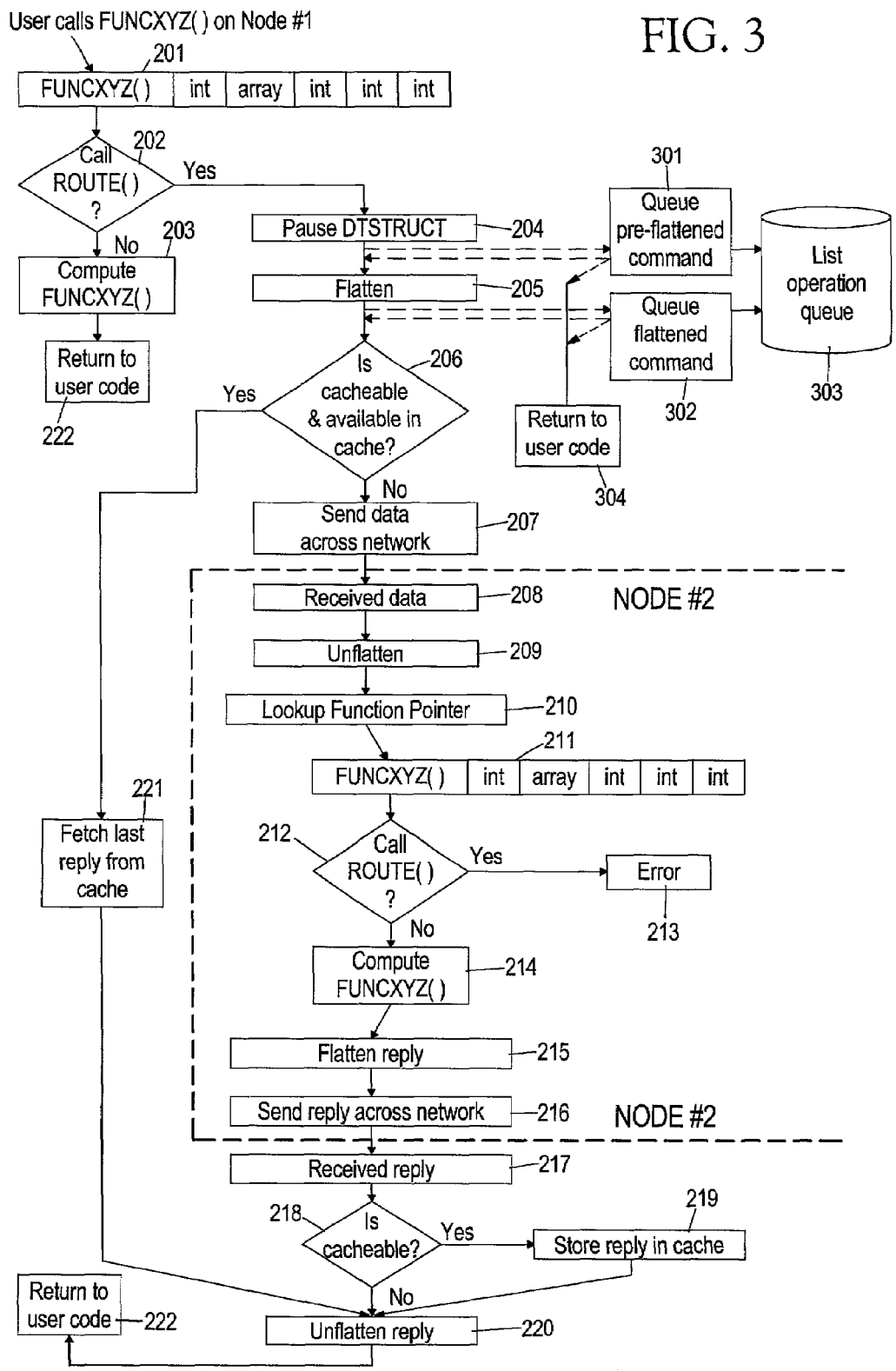
FIG. 3 illustrates an alternative embodiment to the exemplary method shown in FIG. 2.

In another embodiment of the present invention, which is shown in FIG. 3, the method implements an additional queue that may operate to further reduce the network transmission latency problems associated with conventional network remote function-type operations. In the embodiment shown in FIG. 3, commands and/or data may be received after either DTSTRUCT is parsed or after the function data has been flattened, such as in steps 204 or 205 of FIG. 2, for example, and queued prior to being transmitted and executed on the network. Parsed DTSTRUCT information, such as the information output from step 204 in FIG. 2, for example, which may be termed a preflattened command, may be received at step 301 in FIG. 3. Similarly, flattened data, such as data output from step 205 in FIG. 2, for example, may be received at step 302. These commands and/or information may be stored for cooperative execution with other commands sharing similar characteristics at step 303. For example, if either of steps 204 and/or 205 generate one or more commands that were to be executed, then the respective commands may be stored and/or queued at step 303 by the present exemplary embodiment. Thereafter, the queued commands having a common characteristic, which may be that they are all to be executed on a common remote node, may be executed with a single network transaction at step 304. Although this method may require that some commands are not immediately executed as a result of being queued with other similar commands, the end result is that fewer network transactions are required to complete the execution of all the commands. The decision to execute a list may occur as the result of a flush-queue parameter to ROUTE( ) or as a result of a explicit user list-execute command. Additionally, the list may be executed multiple times, and multiple lists may be executable at one time. As such, network latency is reduced and the efficiency of command execution is substantially increased as whole. Additionally, although the present exemplary embodiment illustrates categorization/queuing of commands in accordance with the remote node that the respective commands are being sent to, various other parameters, as are known in the art, may be used to bundle commands for cooperative execution. Thus, the present embodiment is not limited to bundling commands that are to be executed on a common remote node, as other parameters may be used to bundle commands.

For example, FIG. 11 shows 5 physical machines attached to a common network. Each one of those machines may contain multiple applications, wherein each application is designated by a unique network identifier, which may be a node number, in this present exemplary configuration. If, for example, AppA is loaded on node 1, then all of AppA's commands will generally cross the network and ultimately execute on either node 4 or 7. To improve performance, AppA may be loaded directly onto node #4 or node #7 with no code changes, and since the network latency may be reduced to zero, the application may execute much faster. Node 2 exemplifies that multiple nodes may execute on the same machine, as both node 1 and node 2 are within a single workstation. Node 5 exemplifies that commands may route through a node compiled as a 64 bit addressing-mode application, as node 5 is within a workstation. Nodes 6 & 7 exemplify that multiple applications may be loaded on a common node sharing specialized hardware, as these nodes are commonly held on a single embedded CPU sharing specialized hardware 1105.

Returning to the flattening process of the exemplary embodiment illustrated in FIG. 2, the general purpose of the flattening process may be to decode the function related parameters placed on the stack and generate a buffer with all of the values necessary to execute the function on a remote node. The generated buffer generally contains the actual values of the function-related parameters, i.e., no pointer-type parameters indicating where values reside. However, a novel feature of the present exemplary embodiment is that the conventional flattening-type processes do not have information regarding the types of information that are present on the stack. Therefore, the present invention may be configured to inject information into the flattening process that allows the process to determine what types of data are present on the stack. This allows the flattening process to make decisions about what portions of function related data will be transferred across the network to the remote node, as well as allowing the flattening process to assemble the actual function related data into a buffer.

For example, consider the function and associated parameter list {funcxyz(int_value1, int_value2, int*value3, int_size, int_array[32])}, wherein the parenthetical parameter list represents the data required by the function to properly execute. When the function is passed to a flatten routine of the present invention, the flatten routine will attempt to generate a buffer having the actual values represented by the parenthetical parameter list associated with the function. This buffer will generally contain only actual value-type data and not pointers to the location where the data values reside. However, using conventional methods, the flatten routine would not know what types of data and/or information the parenthetical parameter list represents. As such, with conventional methods it is essentially impossible to generate a pure data only buffer, as the types of data represented by the parameter list are unknown to the flatten-type routines. Therefore, the flatten routine of the present exemplary embodiment may be told that "int_value1" and "int_value2" represent specific values that are to be passed to the function for execution. Further, the flatten routine may be told that "int*value3" and "int_array[32]" represents a pointer to value3 and a 32 bit array of values at a particular address, for example. It is important that the flatten routine determine the actual values represented by pointers, array designations, and other function parameters in the list, as once the function is transmitted to a remote node for execution, the local node pointer values will generally be useless, as the pointer addresses will no longer point to the correct memory location on the remote node.

Therefore, the additional information indicating the data type represented by the parameter list may be passed to the flatten routine in order to allow the routine to identify the types of information in the function parameter list resident on the stack. This information may be compiler/interpreter generated and/or inputted by the user, i.e. the programmer of the API. If the information is compiler generated, then the compiler will generally be set up to output the data types such that the required information can be derived. If the information is user inputted, then the user may simply set up a general list that allows a parameter list to be correlated to a particular type of parameter. For example, a parameter in the form of "int*value3" may be set up as a pointer indicating where a particular value resides, while "int_array[32]" may indicate the location of a 32 bit array of data.

Although both compiler generated information and user inputted information are generally effective, it should be noted that the compiler does not always have the information required to determine the data type represented by a function parameter. Therefore, user input of the parameter type and/or correlating list may be preferred, as the user/programmer is generally aware of the exact type of data represented by the individual function parameters in the list. For example, int*value3 may point to a single 32 bit integer, but depending upon how the function is actually programmed, it may just mean that the first 32 bit integer of the array, and thus the entire array should be transmitted. In this scenario it is unlikely that the compiler generated data types would discover this distinction. However, user input is subject to error, and therefore, the present invention also contemplates implementation of an error check routine if a user-input scheme is implemented. For example, the user may execute a data check program that may query into each of the function related parameters in the list and determine if the data type indicated by the user input matches with the data queried. Various query/check-type programs may be implemented with equal effectiveness in accomplishing this function, and therefore, the present invention is not intended to be limited to any particular error checking scheme or program.

Figure 4:
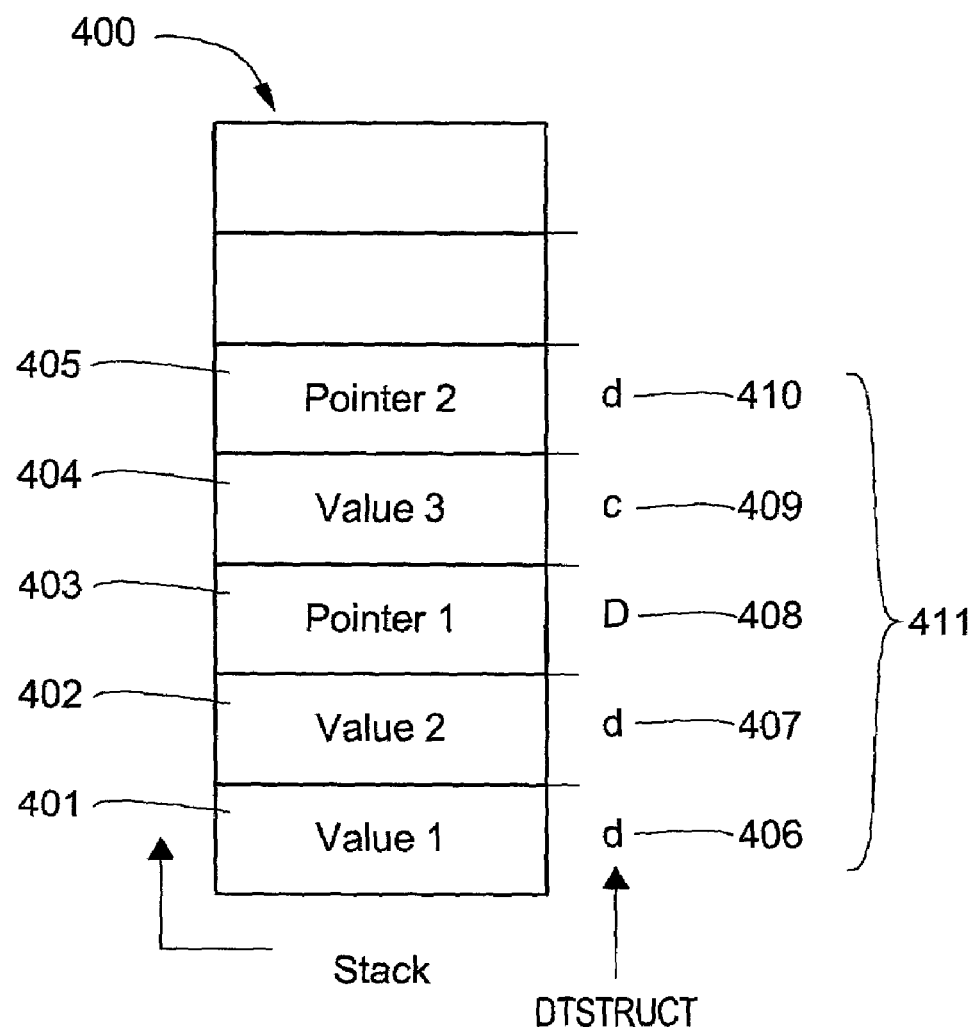
FIG. 4 illustrates an exemplary buffer and information string.

FIG. 4 illustrates an exemplary stack and corresponding additional information that indicates the data type of each of the parameters in the stack. Stack 400 includes a first value 401 in the first location on the stack, a second value 402 in the second location in the stack, a first pointer 403 in a third location in the stack, a third value 404 in a fourth location in the stack, and a second pointer 405 in a fifth location in the stack. Exemplary information corresponding to the type of data residing in the stack location is collectively represented as 411, which may be termed a DTSTRUCT string, as mentioned in previous embodiments. The DTSTRUCT 411 includes individual elements representing the data types of the individual stack locations. For example, the text string "d" 406 may indicate that the first value 401 is an integer. Thus, all values in the stack that are integers would have the text string "d" associated therewith in the corresponding DTSTRUCT 411, such as second value 402, for example. Further, the first pointer 403 may have the text string "D" associated therewith in the DTSTRUCT 411, which may indicate that the first pointer 403 is a 32 bit integer pointer. Further still, for example, the third value 404 may be a 32 bit integer counter field that may designate the size of subsequent arrays also positioned on the stack. Therefore, the 32 bit counter field represented by the third value 404 may correspond to the text string "c" in the DTSTRUCT 411. Finally, the second pointer 405, which follows the counter field value 404, may indicate the starting location for an array having the size indicated by the counter field value 404. Thus, the second pointer 405 may simply be an integer, which may represented by the previously mentioned text string "d" in the DTSTRUCT 411. However, since the counter field 404 preceded the integer field 405, the flattening routine may be configured to utilize the counter field 404 and the array address pointer 405 cooperatively to find and transfer the respective 32 bit array into a buffer.

Therefore, the DTSTRUCT 411 in FIG. 4 operates to indicate the type of data represented on the stack, wherein the data placed on the stack may represent the parameters needed to execute a function. Although the DTSTRUCT in the present exemplary embodiment has been represented as a text string, various alterations and/or other structures that are known in the art may be implemented without departing from the true scope of the present exemplary embodiment. Additionally, since a function that receives a pointer may potentially modify the information indicated by the pointer, the flatten routine should be configured to not only send the information represented by the pointer to a remote node, but also to receive the reply from the remote node and determine if the information represented by the pointer has been changed by the execution of the function on the remote node. If the information has changed, then the flatten routine should store the changed information back in the location indicated by the original pointer on the local node. This allows the local node to view the results of the function without knowing that the function was actually executed on the remote node. Generally these types of operations are handled in an unflatten process, as discussed with regard to FIG. 2.

Given that a pointer parameter for a function on a local node may simply point to a location where the results of the function execution are placed, there is a potential for further optimization of the network data transfer, as a results indicating pointer or the data associated therewith need not be transferred to the remote node. For example, a pointer and the associated data that the remote node will only write to need not be transmitted to the remote node, as transmission of data that will only be overwritten is a waste of network overhead. Rather, the flattening routine of the present invention may be configured to avoid transmission of parameters that the remote node will only write to by merely allocating a buffer of the appropriate size on the remote node. Conversely, if the local node will only write over a portion of data, for example, then the flattening routine on the remote node will not transmit this data back to the local node, as the transmission would only be a waste of network overhead. Thus, the present flattening routine, which may be implemented on various nodes of a network, may be configured to determine if particular parameters associated with a function should actually be transmitted to another node. If transmission of a parameter will be a waste of network overhead, such as when the data will only be overwritten, then the routine will bypass sending the data, and therefore, save the network overhead associated with the transmission.

Once the flattening routine determines what parameters are to be transmitted to the remote node, the respective parameters may be assembled into a buffer. Additionally, the DTSTRUCT parameter may also be placed in the buffer, in an initial buffer location, for example, and the buffer transmitted to the remote node. Upon receiving the buffer contents at the remote node, the DTSTRUCT parameter may be parsed from the buffer and used to identify the types of data present in the received buffer. Using this method, the function associated with the buffer parameters may be executed on the remote node, as the data structure necessary to execute the function that was transmitted to the remote node is essentially identical in substance to that which was present on the local node. Therefore, the function may generally execute on the remote node as if it were on the local node using a replicated stack based on the information in the received buffer.

Figure 5:
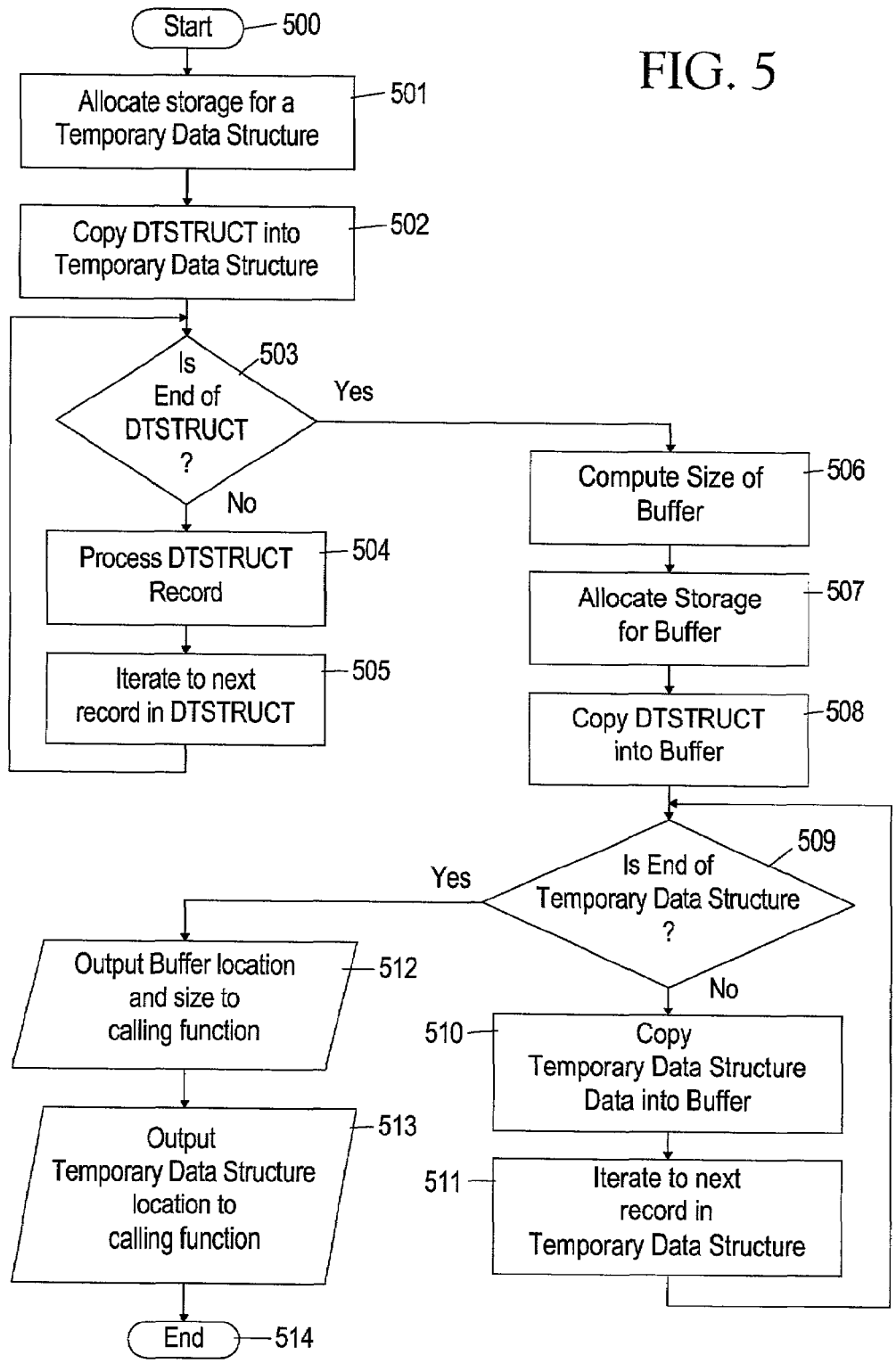
FIG. 5 illustrates an exemplary flatten routine flowchart.

A more detailed illustration of an exemplary flattening routine of the present invention is shown in FIG. 5. The exemplary flatten routine begins at step 500 and continues to step 501 where data storage space is allocated in a memory for storing a temporary data structure. At step 502 the DTSTRUCT representing the parameters associated with function to be executed are copied into the memory storage space generated in step 501. At step 502 the method determines if there are any unprocessed records remaining in the DTSTRUCT string. If there are additional unprocessed records, then the method continues to step 504 where the current DTSTRUCT record is processed, which will be further discussed herein. Once the current record id processed at step 504, then the method increments to the next record in the DTSTRUCT string, if available, and returns to step 503 to determine if the records of the DTSTRUCT string have been exhausted.

If the method determines that there are no more unprocessed records in the DTSTRUCT string at step 503, then the method continues to step 506 where the size of the required buffer to accommodate the processed data is computed. Once the required size is computed, the method continues to step 507 where memory storage space sufficient to receive the buffer-is allocated. On the buffer storage space is allocated the method continues to step 509 where it is determined if it is the end of the temporary data structure. If it is determined that it is not the end of the temporary data structure, then the current record of the temporary data structure is copied into the buffer space in memory at step 510. Thereafter, the method continues to the next record in the temporary data structure at step 511. If the determination at step 509 determines that it is the end of the temporary data structure, then the method continues to step 512 where buffer size and location are outputted to the function to be executed. At step 513 the temporary data structure location is also outputted to the function to be executed before completing the flattening method at step 514.

Figure 6:
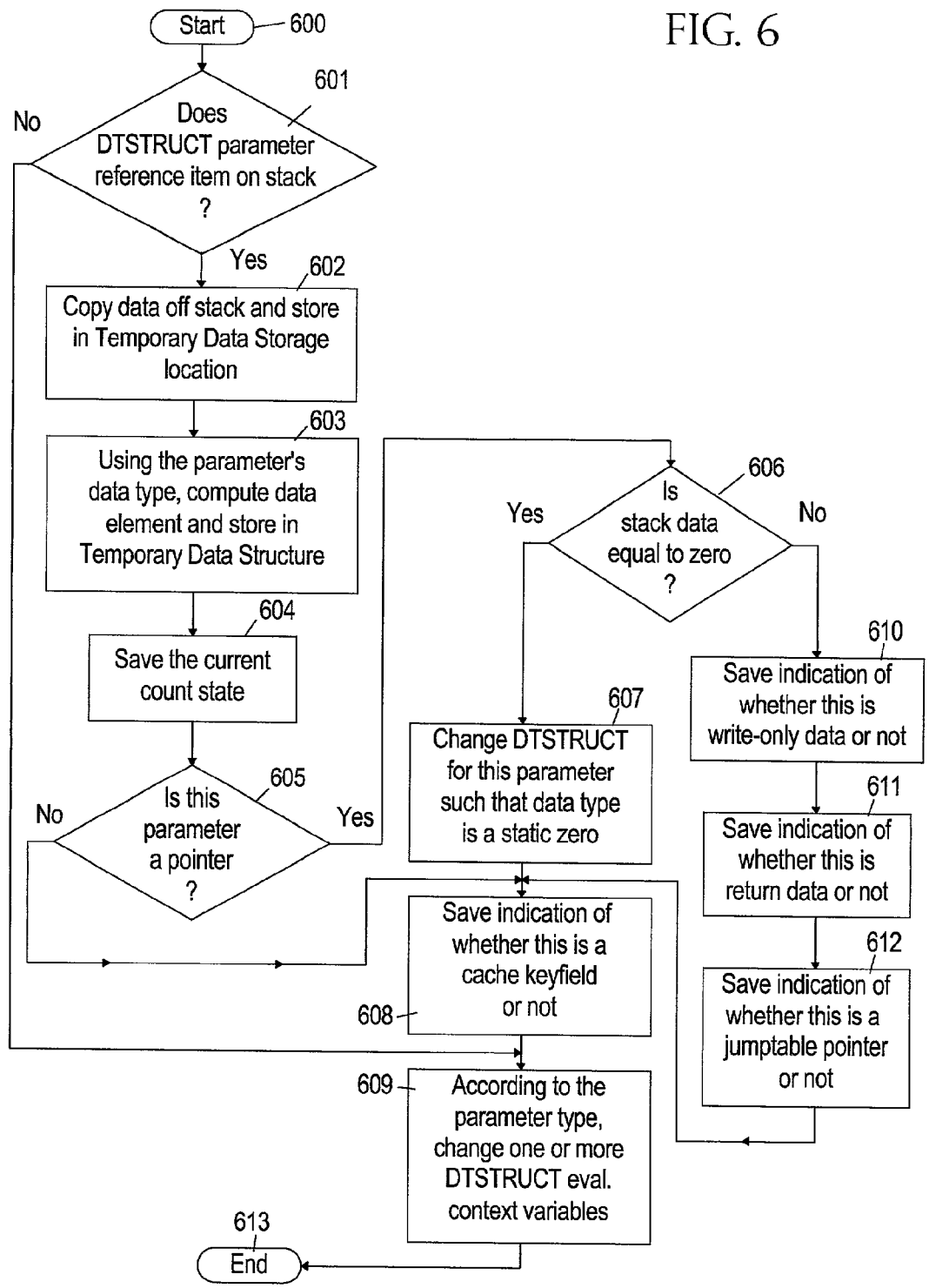
FIG. 6 illustrates an exemplary method for processing a DTSTRUCT.

The step of processing the DTSTRUCT record may be further detailed as illustrated in FIG. 6. The exemplary processing of the DTSTRUCT begins at step 600 and continues to step 601 where it is determined if a DTSTRUCT parameter references an item currently on the stack. If the current parameter references an item on the stack, then the method continues to step 602 where the data off of the stack is copied into a temporary data structure location. Thereafter, at step 603 the parameter type is used to compute the size of the represented data element and then that element is stored in the temporary data structure. At step 604 a current count state is saved and the method continues to step 605 where it is determined if the current parameter represents a pointer. If the current parameter represents a pointer, then the method continues to step 606 where it is determined if the stack data is equal to zero. If the stack data equals zero, then the method continues to step 607 where the DTSTRUCT is changed for the current parameter to that the data type is a static zero. If the stack data is determined not to equal zero at step 606, then the method continues to step 610 where the indication of whether the current parameter is data or not is saved. Thereafter, at step 611 the method saves an indication if whether or not the current parameter is data or not. At step 612 the method saves an indication of whether the current parameter is a jump table pointer parameter or not. Therefore, steps 610–612 represent a plurality of catch states in the processing. Although only three states have been expressly indicated, the present invention contemplates implementing additional catch states and storage operations to save an indication of the type of data that the current parameter represents.

After the sequence of catch steps, the method continues to step 608, which is also the progressing step from step 607. At step 608 the method saves an indication of whether the current parameter is a cache key field before proceeding to step 609. At step 609 the method changes one or more parameters in the DTSTRUCT in accordance with the parameter type determined in the previous steps. Thereafter, the exemplary flattening method is complete for the current parameter at step 613.

Figure 7:
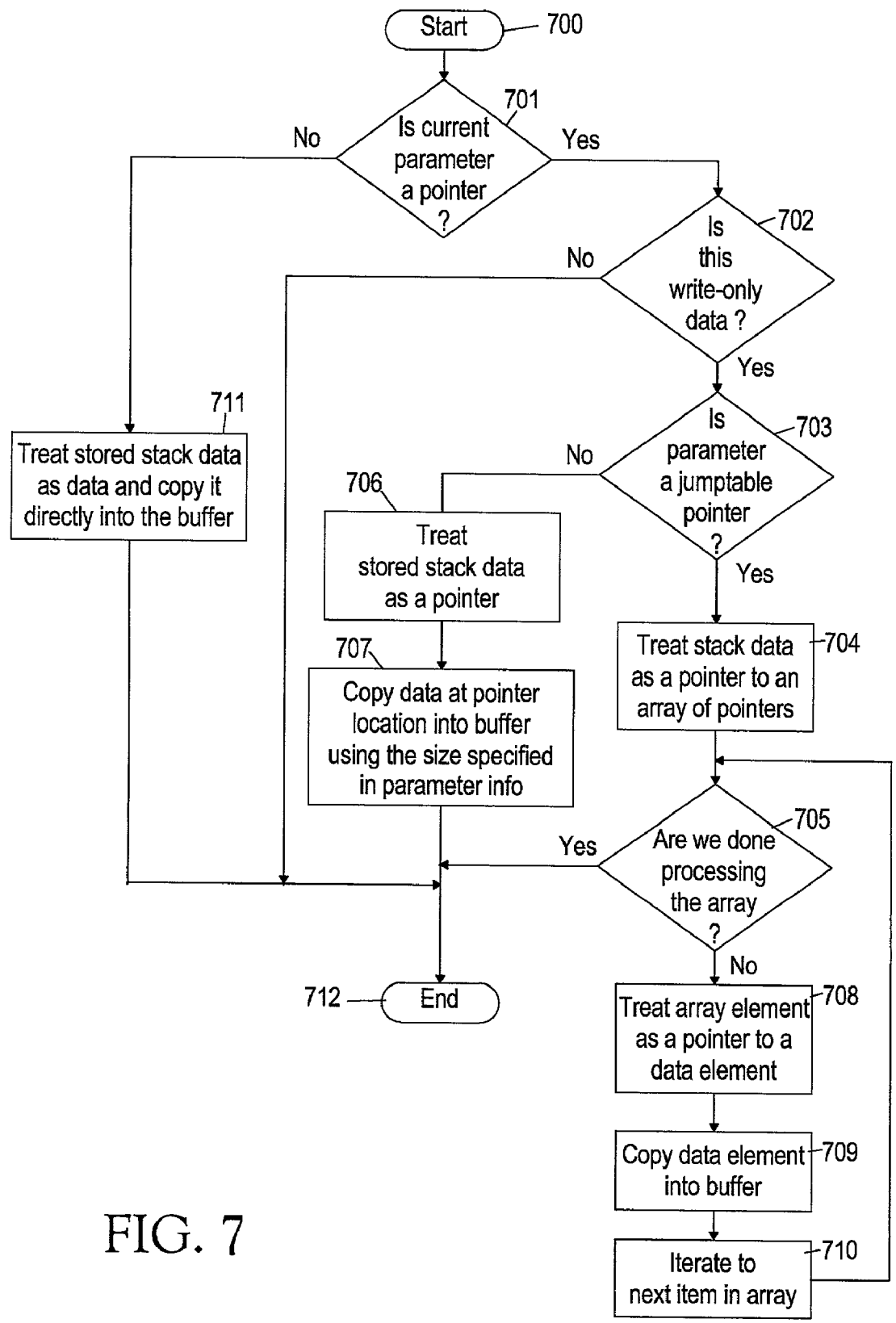
FIG. 7 illustrates an exemplary method for copying data in to a buffer in the present invention.

The process of copying the temporary data structure data into the buffer, for example, step 510 in FIG. 5, may be further illustrated as shown in FIG. 7 starting with step 700. At step 701 the method determines if the current parameter is a pointer. If the current parameter is determined not to be a pointer, then the method continues to step 711 where the data on the stored stack is treated as data and copied directly to the buffer. Alternatively, if it is determined that the current parameter is a pointer at step 701, then the method continues to step 702 where it is determined if the current parameter is initialization type data. If it is determined at step 702 that the current parameter is not initialization data, then the method falls out to end step 712. If the determination at step 702 indicates that the current parameter is initialization data, then the method continues to step 703 where it is determined if the current parameter is a jump-table type parameter. If the current parameter is not determined to be a jump-table type parameter, then the method continues to step 706 where the stored stack is treated as a pointer. Thereafter, the method continues to step 707 where the data at the pointer location is copied into the buffer using the size specified in the parameter information. Thereafter, the method continues to terminating step 712 for the current parameter. If the parameter is determined to be a jump table pointer at step 703, then the method continues to step 704 where the stack data is treated as a pointer to an array of pointers. Thereafter, at step 705 the method determines if the current array has completed processing. If so, then the method continues to the terminating step for the current parameter at step 712. If the array has not yet completed processing, then the method continues to step 708 where the array element is treated as an array to a data element. Thereafter, the method continues to step 709 where the data element is copied into the buffer. At step 710 the method continues to the next element in the array by returning to step 705.

Figure 8:
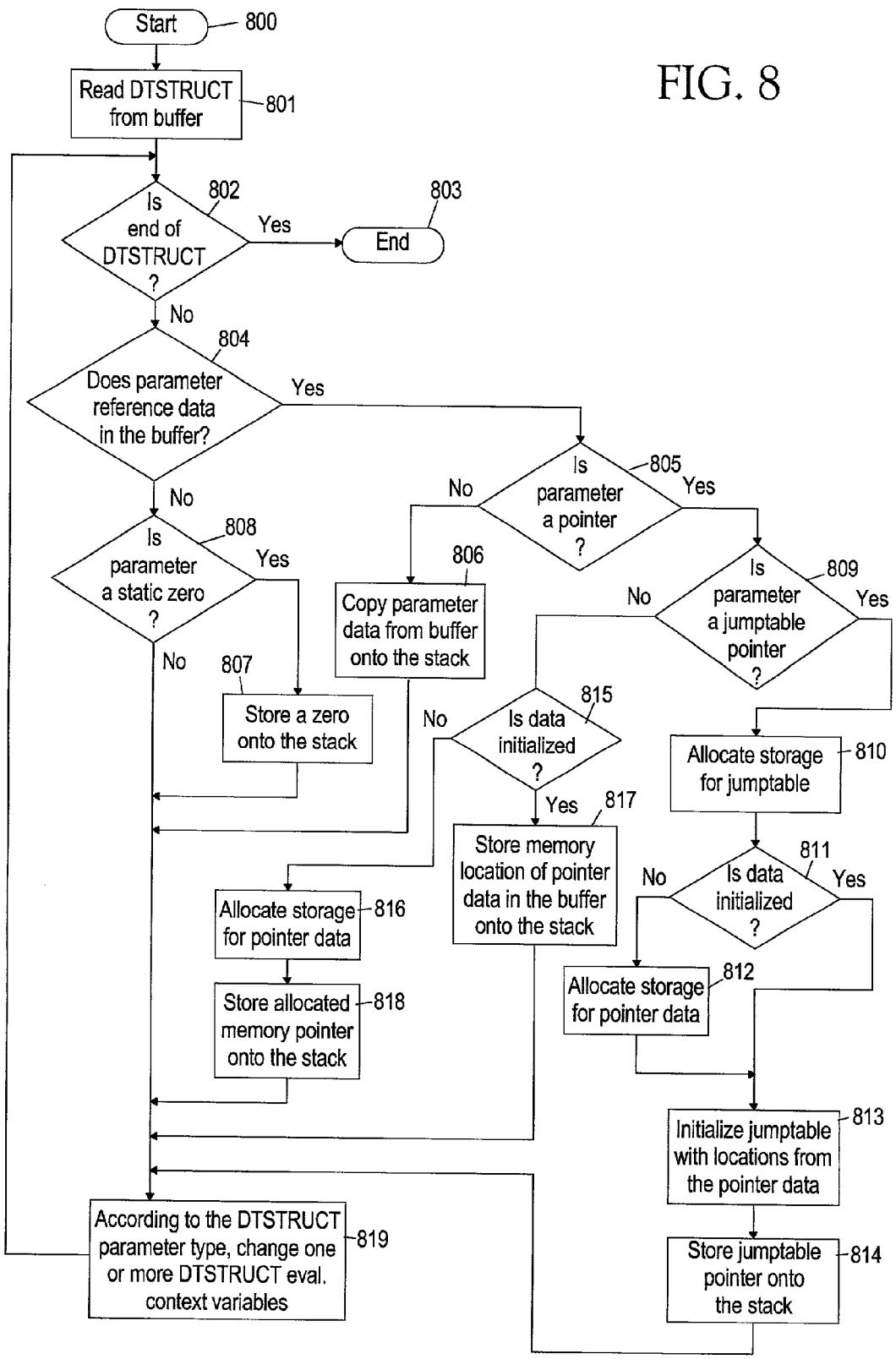
FIG. 8 illustrates an exemplary process of unflattening a message on a remote node of a network.

The unflattening processes, such as those illustrated in steps 209 and 220 in the exemplary embodiment illustrated in FIG. 2, are further illustrated in FIG. 8. In particular, FIG. 8 may represent the unflattening process for a message on the remote node illustrated in FIG. 2. The unflattening process illustrated in FIG. 8 begins with step 800 and continues to step 801 where the DTSTRUCT is read form the buffer. At step 802 the unflattening method continues by determining if it is at the end of the DTSTRUCT string. If it is determined that it is the end of the DTSTRUCT string, then the unflattening process is completed at step 803. If it is determined that it is not the end of the DTSTRUCT string at step 802, then the method continues to step 804 where it is determined if the parameter reference data is in the buffer. If the reference data is determined not to be in the buffer then the method continues to step 808 where it is determined if the parameter is a static zero parameter. If it is a static zero parameter, then a zero is stored onto the stack at step 807. If it is not a static zero parameter, then the method continues to step 819 where according to the DTSTRUCT type, one or more of the DTSTRUCT variables may be changed to reflect the current variable type. After step 819 the method loops back to step 802 to determine if the DTSTRUCT processing is complete. If it is complete, then the method exits to step 803 as noted above. Alternatively, if the reference data is determined to be in the buffer at step 805, then the method continues to step 805 where it is determined if the current parameter is a pointer. If the parameter is determined not to be a pointer, then the method continues to step 806 where the parameter data is copied from the buffer onto the local stack. Thereafter, the method continues to step 819 noted above.

If the parameter is determined to be a pointer at step 805, then the exemplary method continues to step 809 where it is determined if the current parameter designated in DTSTRUCT as a jump table pointer. If the parameter is a jump table pointer, then the method continues to step 810 where storage space for the jump table is allocated. Thereafter, at step 811 the method determines if the data is initialized, and if not, then the method allocates storage space for the pointer data. If the data is determined to be initialized at step 811, then the method continues to step 813, which is also the continuation of step 812, where the jump table is initialized with the locations from the pointer data. Thereafter, the jump table pointers may be stored on the stack at step 814 and the method may continue to step 819 as discussed above.

If it is determined that the current parameter is not a jump table pointer at step 809, then the method continues to step 815 where it is determined if the data is initialized. If the data is not initialized, then the method continues to step 816 where storage space for the pointer data is allocated. Thereafter, at step 818 the allocated memory pointer is stored on the stack and the method continues to step 819. If the data is determined not to be initialized at step 815, then the method continues to step 817 where the memory location of the pointer data in the buffer is stored on the stack. Thereafter, the method also continues to step 819.

Figure 9:
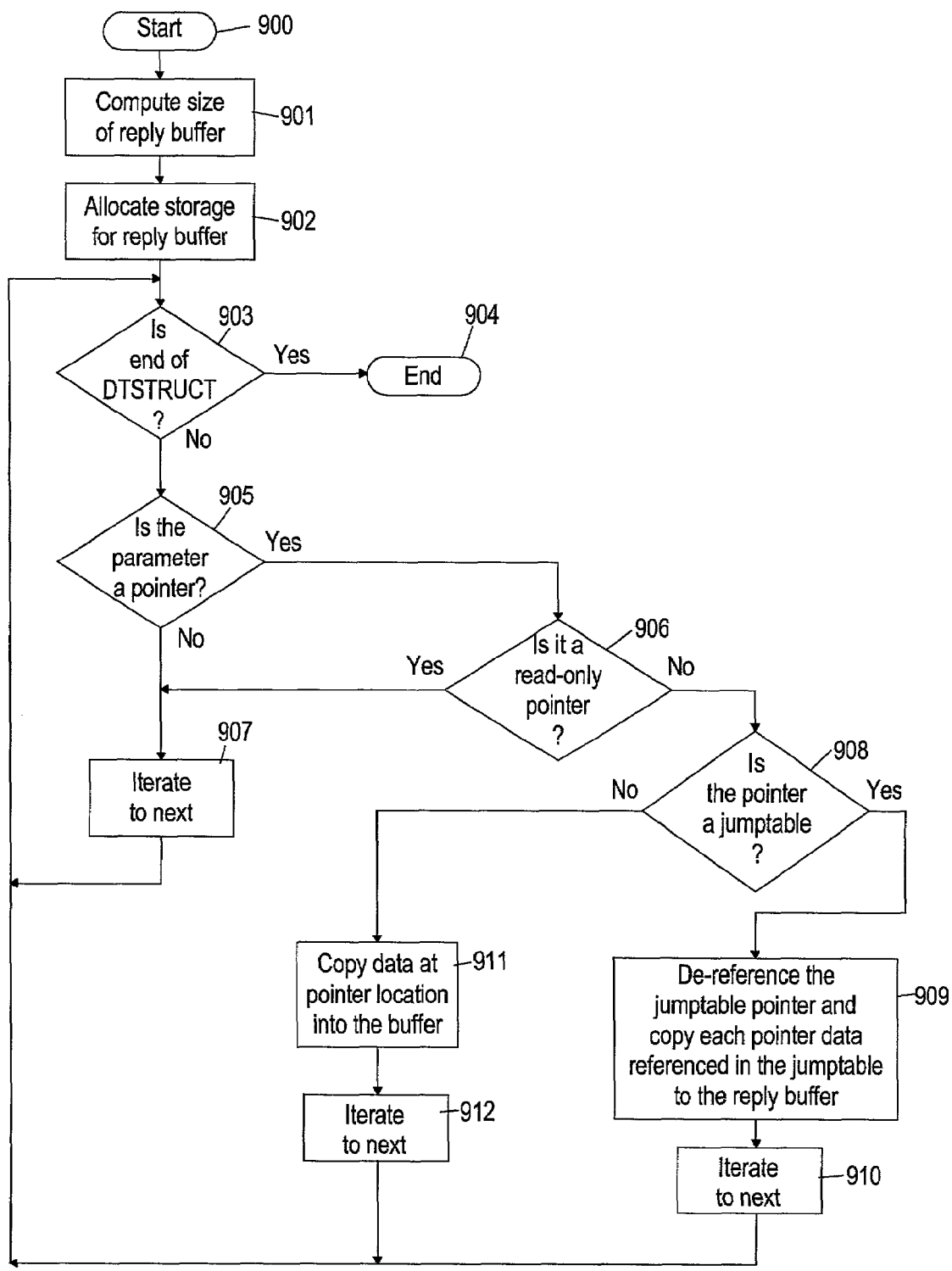
FIG. 9 illustrates an exemplary method for flattening a reply message to be sent from a remote node to a local node.

Although the method for flattening a reply on the remote node before sending the reply back to the local node is similar to the above discussed flattening process, the method is nonetheless somewhat distinct from the above noted flattening process. FIG. 9 is presented as an exemplary method for flattening a reply on a remote node prior to sending the reply back to the local node. The method begins with step 900 and continues to step 901 where the size of the reply buffer is computed. At step 902 memory storage space for the reply buffer is allocated. At step 903 the method determines if the process is at the end of the DTSTRUCT string, and therefore, step 903 is the foundation for the reply flatten process, i.e. the return or loop step in the process. If it is determined that it is the end of the DTSTRUCT string at step 903 then the flattening process is complete and the method continues to step 904. If it is not the end of the DTSTRUCT string, then the method continues to step 905 where it is determined if the current parameter is a pointer. If the current parameter is not a pointer, then the method increments to the next parameter at step 907 and returns to base loop step 903.

If the parameter is determined to be a pointer at step 905, then the method continues to step 906 where it is determined if the pointer is a read only-type pointer. If the pointer is a read only-type, then the method continues to step 907 and returns to the base loop step. If the pointer is determined not to be a read only pointer at step 906, then the method continues to step 908 where it is determined if the pointer is a jump table-type pointer. If the pointer is not a jump table-type, then the method continues to step 911 where the data at the pointer location is copied into the reply buffer for transmission to the local node. Thereafter, at step 912 the method continues to the next parameter in the DTSTRUCT and returns to base loop step 903. If the pointer is determined to be a jump table-type pointer at step 908, then the method continues to step 909 where each pointer data referenced in the jump table is copied into the reply buffer. Thereafter, at step 912 the method continues to the next parameter in the DTSTRUCT and returns to base loop step 903.

Figure 10:
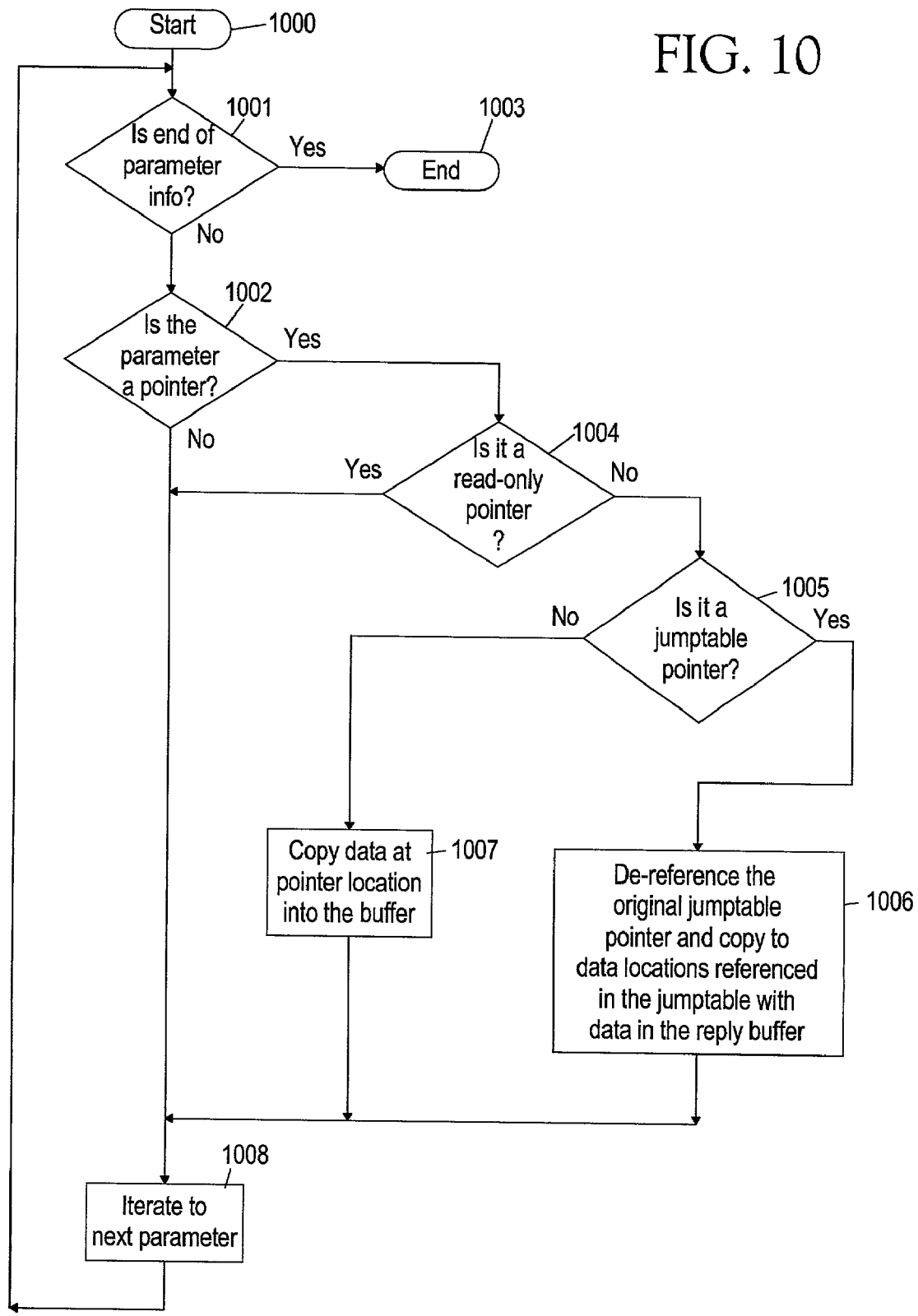
FIG. 10 illustrates an exemplary method for unflattening a reply message received at a local node from a remote node.

Similarly, although the unflattening of a reply at the local node is similar to unflattening the data sent to the remote node for processing, the process is somewhat distinct. Therefore, FIG. 10 is presented as an exemplary illustration of the process of unflattening a reply from a remote node on the local node. The unflattening process begins with step 1000 and continues to step 1001 where it is determined if the process is at the end of the parameter information. If so, then the unflattening process is completed at step 1003. If not, then the method continues to step 1002 where it is determined if the current parameter is a pointer. If the current parameter is determined not to be a pointer, then the method continues to step 1008 where the method increments to the next parameter and returns to base loop step 1001. If the parameter is determined to be a pointer at step 1002, then the method continues to step 1004 where it is determined if the pointer is a read-only pointer. If so, then the method falls out through step 1008 and returns to base loop step 1001. If the pointer is determined no to be a read only pointer at step 1004, then the method continues to step 1005 where it is determined if the pointer is a jump table pointer. If it is not a jump table pointer, then the data from the reply buffer is copied into the original pointer location at step 1007 and the method falls out through step 1008 to base loop step 1001. If the pointer is determined to be a jump table pointer at step 1005, then the data locations referenced in the original jump table are overwritten with data from the reply buffer. If the pointer is determined to be a jump table pointer at step 1005, then the data locations in the original jump table are copied into the reply buffer. Thereafter the method falls out through step 1008 and returns to base loop step 1001.

While the foregoing are directed to the preferred embodiments of the present invention, other and further embodiments of the invention may be devised without departing from the basic scope thereof, and the scope thereof is determined by the claims that follow.

What is claimed is:

1. A computer-implemented method for transmitting local node function parameters from a local node to a remote node for execution of a function on the remote node, comprising:
    associating a representation string with function parameters on a first stack, wherein each character in the representation string corresponds to a data type of an individual function parameter on the first stack;
    dereferencing pointer parameters on the first stack;
    generating a pure value buffer with the function parameters and the dereferenced pointer parameters;
    flattening the pure value buffer by eliminating remote node write only-type data from the pure value buffer;
    transmitting the flattened pure value buffer to the remote node;
    receiving the pure value buffer at the remote node;
    generating a second stack on the remote node mirroring the first stack on the local node;
    executing the function using the remote stack;
    creating a return pure value buffer; and
    transmitting the return pure value buffer to the local node.

2. The method of claim 1, wherein associating the representation string further comprises generating a DTSTRUCT string.

3. The method of claim 1, wherein associating the representation string further comprises assigning a specific text string character to each function parameter data type on the first stack, wherein the assigning is conducted by at least one of a user input and a compiler generation operation.

4. The method of claim 1, wherein dereferencing pointer parameters on the first stack further comprises retrieving data represented by the pointer parameters and placing the data represented by the pointer parameters on the pure value buffer.

5. The method of claim 1, wherein flattening further comprises eliminating local node read only-type data from the pure value buffer.

6. The method of claim 1, wherein generating the second stack further comprises using the representation string to recreate the second stack from the pure value buffer.

7. The method of claim 1, further comprising:
receiving the return pure value buffer on the local node;
regenerating the first stack on the local node; and
replacing each pointer that was written back in an original memory location pointed to by the first stack.

8. A computer readable medium storing a software program that, when executed by a processor, causes the processor to perform a method for transmitting local node function parameters to a remote node for execution of a function on the remote node, comprising:
associating a representation string with function parameters on a first stack, wherein each character in the representation string corresponds to a data type of an individual function parameter on the first stack;
dereferencing pointer parameters on the first stack;
generating a pure value buffer with the function parameters and the dereferenced pointer parameters;
flattening the pure value buffer by eliminating remote node write only-type data from the pure value buffer;
transmitting the flattened pure value buffer to the remote node;
receiving the pure value buffer at the remote node;
generating a second stack on the remote node mirroring the first stack on the local node;
executing a function using the second stack;
creating a return pure value buffer; and
transmitting the return pure value buffer to the local node.

9. The computer readable medium of claim 8, wherein associating the representation string further comprises generating a DTSTRUCT string.

10. The computer readable medium of claim 8, wherein associating the representation string further comprises assigning a specific text string character to each function parameter data type on the first stack, wherein the assigning is conducted by at least one of a user input and a compiler generation operation.

11. The computer readable medium of claim 8 wherein dereferencing pointer parameters on the first stack further comprises retrieving data represented by the pointer parameters and placing the data represented by the pointer parameters on the pure value buffer.

12. The computer readable medium of claim 8, wherein flattening further comprises eliminating local node read only-type data from the pure value buffer prior to transmitting the pure value buffer to the remote node.

13. The computer readable medium of claim 8, wherein generating the second stack further comprises using the representation string to recreate the second stack from the pure value buffer.

14. The computer readable medium of claim 8, further comprising:
receiving the return pure value buffer on the local node;
regenerating the first stack on the local node; and
replacing each pointer that was written back in an original memory location pointed to by the first stack.

* * * * *